AUTOMATIC GAIN AND AMPLITUDE BALANCE CONTROL SYSTEM FOR HYPERBOLIC NAVIGATION RECEIVERS

Filed Aug. 2, 1954

INVENTOR
EDWARD DURBIN
BY B. F. Spencer
AGENT

United States Patent Office 2,769,976

Patented Nov. 6, 1956

2,769,976

AUTOMATIC GAIN AND AMPLITUDE BALANCE CONTROL SYSTEM FOR HYPERBOLIC NAVIGATION RECEIVERS

Edward Durbin, Valley Stream, N. Y., assignor to Sperry Rand Corporation, a corporation of Delaware Application August 2, 1954, Serial No. 446,999

9 Claims. (Cl. 343—103)

Figures 1, 2:
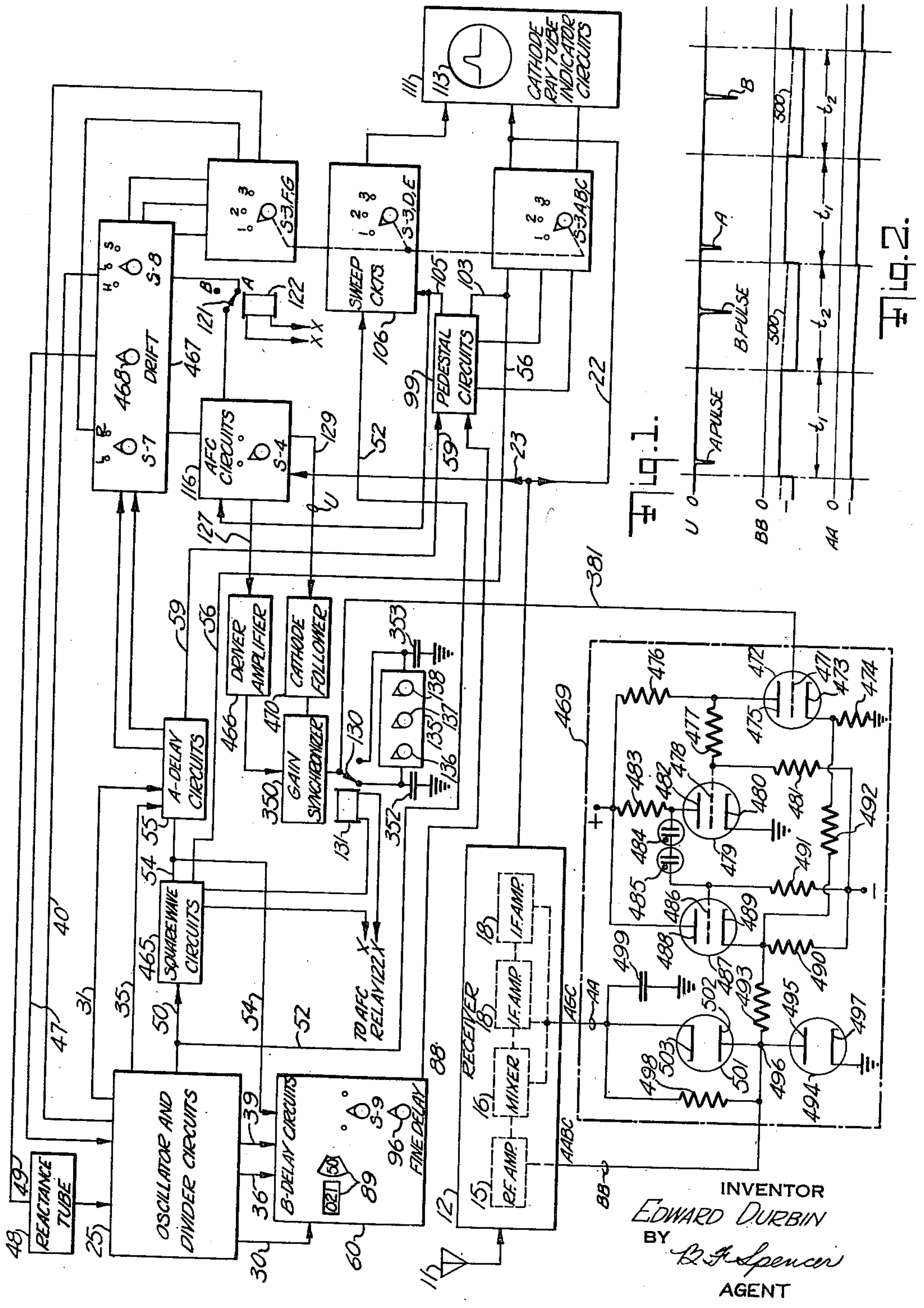

The present invention relates to gain control systems, and in particular to a simplified automatic gain and amplitude balance control system useful in loran receiver-indicators.

In Patent 2,651,033, assigned to the same assignee as the present application, there is taught an automatic amplitude balance control (AABC) system for a loran receiver-indicator in which the gain of the receiver is automatically and sequentially varied according to the amplitudes of received master and slave pulse voltage waves to maintain the output master and slave pulse voltages substantially equal in magnitude. This AABC system operates in conjunction with an automatic gain control system to maintain the received output master and slave pulses at a suitably predetermined constant value.

In pending application S. N. 403,771, filed January 13, 1954 in the name of Wilbert P. Frantz, entitled "Automatic Amplitude Balance Control System for Hyperbolic Navigation Receivers" now Patent No. 2,732,549, and assigned to the same assignee as the present invention, there is disclosed a simplified AABC system useful in loran receiver-indicators for varying the gain of the receiver automatically and sequentially in the same general manner as taught in the aforesaid patent.

In application S. N. 403,852, filed January 13, 1954 in the name of Wilbert P. Frantz, entitled "Automatic Gain Control System for Hyperbolic Navigation Receivers," now Patent No. 2,728,908 and assigned to the same assignee as the present invention, there is disclosed an improved automatic gain control (AGC) system useful in loran receiver-indicators for automatically controlling the amplification of the loran receiver in accordance with the strength of the smaller of the received master or slave pulse voltage waves. This improved AGC system enables the loran receiver to automatically amplify the smaller of the received master or slave pulses to a predetermined output level.

The present invention is related to these prior pending applications and discloses a simplified automatic gain and amplitude balance control system which automatically and sequentially controls the gain of the loran receiver in the same general manner as taught in Patent 2,651,033 and in application S. N. 403,771, while at the same time automatically controlling the amplification of the receiver in accordance with the strength of the smaller of the received master or slave pulses, as taught in the aforesaid application S. N. 403,852.

Accordingly, a principal object of the present invention is to provide a simplified circuit arrangement for automatically controlling both the gain and amplitude balance of a loran receiver-indicator.

Another object is to provide a gain and amplitude balance control circuit employing a single direct-coupled amplifier for amplifying both AABC and AGC voltages.

Still another object is to provide a simplified circuit arrangement for producing an AGC voltage whose magnitude is determined by the smaller of the received master or slave pulse voltage waves.

In accordance with the present invention there is introduced a simplified system for producing automatic gain and balance control voltages for a loran receiver-indicator including a vibrating relay having a movable contact coupled to the output of the receiver for coupling the received A pulses to a first energy storage device and for coupling the received B pulses to a second energy storage device. The first energy storage device is charged to a first direct potential according to the peak value of the A pulses and the second energy storage device is charged to a second direct potential according to the peak value of the B pulses. A square-wave voltage is obtained from the movable contact which alternates between the first direct potential and the second direct potential. This square-wave voltage is supplied to a direct-coupled amplifier, and the amplified output voltage is applied directly to the R. F. amplifier of the loran receiver as the AABC voltage. The amplified square-wave voltage is further supplied to an integrator and rectifier clamping circuit which produces a direct control output voltage varying according to the magnitude of the smaller or least negative half-cycle of the amplified square-wave voltage. This latter control voltage is supplied directly to the mixer and I. F. amplifiers of the loran receiver as the AGC voltage. As a result, the loran receiver produces output A and B pulses whose amplitudes are equal to a predetermined output level.

The above objects of and the brief introduction to the present invention will be more fully understood, and further objects and advantages will become apparent from a careful study of the following detailed description in connection with the drawing, wherein:

Fig. 1 illustrates a combination block and schematic diagram of a loran receiver-indicator employing the simplified automatic gain and amplitude balance control system of the invention, and Fig. 2 shows the waveforms of voltages associated with the simplified automatic gain and amplitude balance control circuits.

Those elements in the accompanying drawing full corresponding to those in the aforesaid Patent 2,651,033 are identified by the same reference numerals as employed therein.

Referring to Fig. 1, loran A and B pulses of carrier-wave energy from remote master and slave stations are collected by antenna 11 and supplied to the input of superheterodyne receiver 12. Receiver 12 is very similar to the receiver shown and described in the aforesaid Patent 2,651,033. The received A and B pulses are amplified, detected and supplied as positive A and B pulses to the cathode-ray tube indicator circuits 111 over lead 22, and over lead 23 to the AFC circuits 116. The automatic gain and amplitude balance control voltages from the simplified circuits of the present invention are supplied to receiver 12 as will be explained more fully hereinafter.

The precision timing circuits of the loran receiver-indicator include the oscillator and divider circuits 25, the square-wave circuits 465, the A-delay circuits 55, and the B-delay circuits 60. These circuits are similar to those described and claimed in application S. N. 633,473, filed December 7, 1945 in the name of Winslow Palmer, entitled "Timing Apparatus" now Patent No. 2,731,634 and assigned to the same assignee as the present invention. These circuits are identical with those shown and described in the aforesaid patent, and, therefore, will be described only briefly in the present specification.

*Oscillator and divider circuits*

The conventional oscillator and divider circuits 25 comprise a crystal-control oscillator operating at 100 kilocycles per second, and a cascade of five frequency dividers dividing the frequency of the oscillator output voltage in the steps of 5, 4, 5, 5, and 4 respectively for rate LO, followed by a transient delay circuit. These frequency divider circuits supply the basic timing voltages for the loran receiver-indicator. The output voltage from the first frequency divider is supplied over lead 30 to one input of the B-delay circuits 60, and over lead 31 to one input of the A-delay circuits 55. The output voltage from the third frequency divider is supplied over lead 35 to another input of the A-delay circuits, and over lead 36 to a second input of the B-delay circuits. The output voltage from the fourth frequency divider is supplied over lead 39 to a third input of the B-delay circuits. The output from the transient delay circuit is coupled over lead 50 to the input of the square-wave circuits 465, and over lead 52 to the sweep circuits 106.

The basic pulse repetition rates used in loran are 33⅓, 25, and 20 cycles per second, and are identified by the letters H, L, and S. These pulse repetition rates are provided in the oscillator-divider circuits 25 by switch S–8 coupled over lead 40 to the fifth frequency divider of the oscillator-divider circuits. This switch controls the frequency division of the fifth frequency divider to provide a division of three for the rate H, four for the rate L, and five for the rate S.

A reactance tube circuit 48 is coupled to the 100 kilocycle-per-second crystal oscillator, and corrects the frequency of this oscillator in response to an AFC voltage supplied over lead 49 from the AFC circuits 116.

*Square-wave circuits*

The square-wave circuits 465 include a square-wave generator, a push-pull cathode follower, and a relay driver. The positive output pulse voltage on lead 50 from the oscillator and divider circuits is differentiated at the two inputs of an Eccles-Jordan circuit used as the square-wave generator to produce a square-wave output voltage whose frequency is equal to one-half the repetition frequency of the differentiated triggering pulses. The frequency of this square-wave voltage corresponds to the pulse repetition frequency of the loran signals. The mark and space time intervals of the square-wave voltage are each equal to 20,000 microseconds for the loran pulse rate LO. The square-wave voltage is supplied to a push-pull cathode follower which produces two square-wave output voltages, one inverted in phase with respect to the other. One of these square-wave voltages is supplied to the input of the A-delay circuits 55 and to the B-delay circuits 60, and the other square-wave voltage is supplied over lead 56 to operations switch S–3C. Both of the square-wave voltages from the cathode follower are supplied to the relay driver which provides a square-wave voltage for relays 122 and 131. The square-wave voltage supplied to the A-delay circuits 55 is subsequently synchronized with respect to the received loran signals by the AFC circuits 116 such that the negative half-cycle of the square-wave voltage corresponds with the time interval during which the A pulses from the master station arrive at receiver 12. The positive half-cycle of the square-wave voltage on lead 54 corresponds to the time interval during which the B pulses from the slave station arrive at the receiver, and the positive half-cycle of this square-wave voltage energizes the B-delay circuits 60.

*A-delay circuits*

The A-delay circuits 55 comprise a pedestal delay circuit and a pedestal synchronizer, as is more fully described in the aforesaid Patent 2,651,033. The square-wave voltage on lead 54 is differentiated to produce negative trigger pulses coincident with the "negative going" edges of the square-wave voltage, and these negative trigger pulses initiate the pedestal delay circuit. The voltage on lead 35 from the third frequency divider is also differentiated and terminates the pedestal delay circuit by the first of the trigger pulses to arrive following the initiation of the pedestal delay circuit. The pedestal delay circuit produces both positive and negative rectangular pulses of one-thousand microseconds duration and whose recurrence interval is the same as the square-wave voltage on lead 54.

Both the positive and negative pulses are applied to the "left-right" switch S–7, and these pulses are coupled through position 1 of switch S–3F to the input of the third frequency divider over lead 47 to delay or advance the triggering of the third frequency divider thereby causing an increase or decrease in the recurrence interval of the output pulses from the fifth divider. This change in recurrence interval results in a change in the sweep voltage recurrence interval applied to the cathode-ray tube circuits 111 and causes the received loran pulses to drift toward the left or right, as further described in the aforesaid Patent 2,651,033.

The pedestal synchronizer is initiated by negative trigger pulses derived from the trailing edges of the positive pulses from the pedestal delay circuit. The pedestal synchronizer is terminated by the first of the 50 microsecond negative trigger pulses on lead 31 to arrive following the initiation of the pedestal synchronizer. The pedestal synchronizer produces a series of positive pulses of approximately 50 microseconds duration and whose recurrent interval is the same as the square-wave voltage on lead 54. The trailing edges of these positive output pulses are delayed approximately 1,050 microseconds from the trailing edges of the square-wave voltage on lead 54, and the timing of the trailing edges is under the accurate control of the pulses on lead 31 from the first frequency divider. These recurrent output pulses are coupled over lead 59 to the input of pedestal circuits 99.

*B-delay circuits*

The B-delay circuits 60 are similar to those shown and described in the aforesaid application S. N. 633,473, and are identical to those shown and described in the aforesaid Patent 2,651,033. The function of the B-delay circuits 60 is to produce recurrent variably-delayed output pulses whose recurrence interval is equal to the recurrence interval of the square-wave voltage on lead 54, and whose time delay with respect to the recurrent output pulses from the A-delay circuits 55 is adjustable by accurately known amounts indicated on a time difference counter 89. This time delay difference is established with an absolute accuracy better than one microsecond. The recurrent variably-delayed output pulses from B-delay circuits 60 occur during the positive half-cycle of the square-wave voltage on lead 54, and the recurrent output pulses from A-delay circuits 55 occur during the negative half-cycle of the square-wave voltage. Therefore, a fixed time delay exactly equal to one-half the recurrence interval of the square-wave voltage on lead 54 exists between the recurrent pulses from the B-delay circuits 60 on lead 88 and the recurrent pulses from the A-delay circuits 55 in addition to the variable time delay introduced by the B-delay circuits.

The recurrent variably-delayed rectangular output pulses on lead 88 from the B-delay circuits 60 are approximately 30 microseconds in duration, and the trailing edges of these pulses vary in time relative to the trailing edges of the output pulses from the A-delay circuits 55 smoothly and continuously over the range of exactly 0 to almost 20,000 microseconds plus exactly one-half the recurrence time interval of the received loran A and B pulses under the control of the coarse delay switch S–9 and the fine delay control knob 96.

*Pedestal circuits*

The pedestal circuits 99 comprise a pulse mixer and a pedestal generator. Negative trigger pulses derived by differentiating the trailing edges of the positive recurrent output pulses on lead 59 are combined in the pulse mixer with negative trigger pulses derived by differentiating the trailing edges of the positive recurrent output pulses on lead 88. Each of these negative trigger pulses initiate the pedestal generator, a monostable multivibrator, which is terminated automatically by its own action. The pedestal generator provides separate positive and negative output pedestal pulses. The pulse voltage on lead 59 from the A-delay circuits produces the A pedestal, and the variably-delayed pulses on lead 88 from the B-delay circuits produce the B pedestal. Positive A and B pedestal pulses are supplied over lead 103 to the operations switch S–3A and C. The square-wave voltage on lead 56 from the square-wave circuits 465 is combined with the positive pedestal pulses on lead 103. The negative A and B pedestal pulses are supplied over lead 105 to operations switch S–3E, and to the AFC circuits 116, as more fully described in the aforementioned Patent 2,651,033.

*Sweep circuits*

The sweep circuits 106 include a gate generator, a sweep generator for producing a slow, medium, or fast sweep-speed voltage, and a sweep restorer. Trigger pulses produced from the trailing edges of the recurrent output pulse voltage from the oscillator-divider circuits 25 on lead 52 initiate the gate and sweep generator to produce the slow sweep-speed voltage when the switch S–3E is in position 1. The medium and fast sweep-speed voltages are produced when the operations switch S–3E is in positions 2 and 3, respectively, and these sweep voltages are initiated by the recurrent negative pedestal pulses supplied to the sweep generator over lead 105. The medium and fast sweep-speed voltages are coincident with and extend for the duration of the recurrent negative A and B pedestal pulses. The sweep restorer clamps the lower edges of the three sweep-speed voltages to a reference voltage level to insure that the cathode-ray trace starts from the same point on the face of the cathode-ray tube for each of the three sweep-speed voltages.

*Cathode-ray tube indicator circuits*

The cathode-ray tube indicator circuits 111 include a cathode-ray tube, a horizontal sweep amplifier, a vertical amplifier, and an intensity restorer. The sweep voltages from the sweep circuits 106 are amplified in the horizontal sweep amplifier and applied to the horizontal deflection plates of the cathode-ray tube 113. The vertical amplifier amplifies the composite voltage consisting of the A and B pedestal pulses on lead 103, the square-wave voltage on lead 56, and the received loran A and B pulses on lead 22, and supplies these voltages to the vertical deflection plates of the cathode-ray tube. The positive A and B pedestal pulses on lead 103 are supplied through positions 2 and 3 of switch S–3A to the input of the intensity restorer. The restorer clamps the upper edges of these positive pedestal pulses to a fixed voltage level corresponding to normal intensity of the cathode-ray trace on the face of the cathode-ray tube, and the negative portions of these pedestal pulses, corresponding to the time intervals between sweeps, bias the control-grid of the cathode-ray tube so as to blank the cathode-ray beam.

*Automatic frequency control circuits*

The automatic frequency control circuits 116 are similar to those described and claimed in Patent 2,636,988, and are identical with those as shown and described in the aforesaid Patent 2,651,033. The AFC circuits 116 include an AFC delay circuit, and AFC amplifier, and an AFC synchronizer. Negative trigger pulses derived from the leading edges of the negative A and B pedestal pulses on lead 105 initiate the AFC delay circuit. This circuit produces negative output pulses of approximately 100 microseconds duration, and these negative pulses are applied to a differentiating circuit at one input of the AFC synchronizer and over lead 127 to a differentiating circuit at the input of driver amplifier 466. The differentiating circuit produces first positive output trigger or sampling pulses from the trailing edges of the negative 100 microsecond pulses initiated by the negative A pedestal pulses on lead 105, and produces second positive output trigger or sampling pulses from the trailing edges of the negative 100 microsecond pulses initiated by the negative B pedestal pulses on lead 105.

Positive loran A and B pulses from receiver 12 are supplied over lead 23 to the AFC amplifier where they are further amplified and supplied to a differentiating circuit at another input of the AFC synchronizer. The differentiating circuit produces bi-directional pulses from the A and B pulses as more fully described in Patent 2,636,988. Switch S–4 places the AFC circuits 116 in operation. The AFC synchronizer produces first and second recurrent output pulses of current. The magnitude of the first pulses varies according to the relative time position or coincidence between the applied differentiated bi-directional A pulses and the applied first positive sampling pulses. The magnitude of the second pulses of current varies according to the relative time position or coincidence between the applied differentiated bi-directional B pulses and the second positive sampling pulses. These first and second output pulses of current are supplied to the armature or movable contact 121 of relay 122. The relay is energized by the square-wave voltage from the square-wave circuits 465 to separate the first output pulses of current from the AFC synchronizer from the second output pulses of current. The first output pulses, varying in magnitude and polarity according to the relative time position of the differentiated bi-directional A pulses with respect to the applied first positive sampling pulses, are applied to a long time constant filter within box 467 where they are integrated to produce the automatic frequency control voltage. This AFC voltage is applied to reactance tube 48 over lead 49 to maintain the frequency of the 100 kilocycle-per-second oscillator in the oscillator-divider circuits 25 such that the first positive sampling pulses applied to the AFC synchronizer are coincident with the cross-over of the differentiated bi-directional A pulses, as taught in Patent 2,636,988. The magnitude of the AFC voltage on lead 49 is under the independent manual control of drift control knob 468.

*Automatic gain and amplitude balance control circuits*

The automatic gain and amplitude balance control circuits of the present invention include driver amplifier 466, gain synchronizer 350, relay 131, and the direct-coupled amplifier and rectifier circuits 469. Recurrent negative 100 microsecond pulses are supplied from the AFC circuits 116 over lead 127 to a differentiating circuit at the input of driver amplifier 466. The differentiating circuit produces first and second positive sampling pulses from the trailing edges of these recurrent negative 100 microsecond pulses in the same manner as described in connection with the AFC circuits 116, and these amplified first and second positive sampling pulses energize the gain synchronizer 350. Negative loran A and B pulses of waveform U, Fig. 2, from the AFC circuits 116 are supplied over lead 129 to a cathode follower 470 and from the cathode follower to another input of gain synchronizer 350. Synchronizer 350 may be a four-diode switch as shown in Fig. 10.10 on page 374 of the book "Waveforms" published by the McGraw-Hill Book Co., 1949.

The gain synchronizer produces first recurrent output pulses of current whose magnitude varies according to the coincidence between the first positive sampling pulses and the negative loran A pulses, and produces second recurrent output pulses of current whose magnitude varies according to the coincidence between the second positive sampling pulses and the negative loran B pulses. Since the first positive sampling pulses occur coincident with the cross-over of the differentiated bi-directional A pulses by action of the AFC system, these particular positive sampling pulses occur at instants corresponding to the peak of the received loran A pulses. Accordingly, the magnitude of the first output pulses of current from the gain synchronizer vary according to the peak value of the A pulses.

In a similar manner, the second positive sampling pulses are brought into coincidence with the negative loran B pulses to produce second output current pulses from the gain synchronizer which vary in magnitude according to the peak value of the B pulses. Since the second positive sampling pulses are derived from the variably-delayed B pedestal pulses on lead 105, they are likewise variably-delayed pulses. To bring the second positive sampling pulses into coincidence with the received loran B pulses, the time position of these positive sampling pulses is varied under the control of coarse-delay switch S–9 or the fine-delay knob 96 of the B-delay circuits 60 to match the received loran A and B pulses on the face of the cathode-ray tube 113 as in the normal operating procedure. When the A and B pulses are properly matched on the face of the cathode-ray tube 113, the second positive sampling pulses are coincident with the peak value of the received loran B pulses.

The first and second recurrent output pulses from the gain synchronizer 350 are coupled to the armature or movable contact 130 of relay 131. The winding of relay 131 is energized by the square-wave voltage from the relay driver of the square-wave circuits 465 to couple the first output pulses of current to a condenser 352, and the second output pulses of current to a condenser 353. Condenser 352 is charged to a first negative direct potential according to the magnitude of the first current pulses, and condenser 353 is charged to a second negative direct potential according to the magnitude of the second current pulses.

Control box 135 includes an automatic balance control on-off switch 136, a manual gain control 137, and a manual amplitude balance control 138, as explained more fully in the aforesaid Patent 2,651,033. When the switch 136 is in the off position the control box supplies manually adjustable direct control voltages across each condenser 352 and 353. The manual gain control 136 raises or lowers the applied control voltages together, and the manual amplitude balance control 138 varies the voltage supplied to one condenser relative to the voltage supplied to the other condenser.

The potential existing at the armature or movable contact 130 of relay 131 alternates between the negative direct potential on condenser 352 and the negative direct potential on condenser 353 at the frequency of the square-wave voltage applied to relay 131. When the negative direct potentials across condensers 352 and 353 are equal, representing the condition when the strength of the received loran A pulses is equal to the strength of the loran B pulses, there is no alternating voltage at armature 130. However, a negative direct potential is present at the armature equal to the peak magnitudes of the loran A and B pulses. When the strength of the received A pulses is different from the strength of the received B pulses, a square-wave voltage is available at the armature 130 whose phase is determined by the stronger of the received A and B pulses, and whose magnitude alternates between the negative direct potentials on condensers 352 and 353.

When the negative A pulses supplied to gain synchronizer 350 are smaller in magnitude than the negative B pulses, as illustrated by waveform U of Fig. 2, condenser 352 is charged to a smaller negative direct potential than condenser 353. Conversely, when the negative A pulses are larger than the negative B pulses, condenser 352 is charged to a larger negative direct potential than condenser 353.

The negative pulsating voltage at armature 130 is coupled over lead 381 to the input of the direct-coupled amplifier and rectifier circuits 469. This pulsating direct voltage is applied to the control-electrode 471 of a first direct-coupled amplifier tube 472. Cathode 473 is coupled through cathode resistor 474 to ground. Anode 475 is coupled through load resistor 476 to a source of positive potential, and the amplified output voltage at the anode is coupled through series resistor 477 to the control-electrode 478 of a second direct-coupled amplifier tube 479. Cathode 480 is coupled directly to ground. Bias voltage for the control-electrode 478 is supplied through resistor 481 from a source of negative potential. Anode 482 is coupled through load resistor 483 to a source of positive potential, and the amplified voltage appearing at this anode is coupled through neon tubes 484 and 485 to the control-electrode 486 of cathode follower tube 487. Anode 488 is coupled directly to a source of positive potential, and cathode 489 is coupled through cathode resistor 490 to a source of negative potential. Control-electrode 486 is coupled through resistor 491 to a source of negative potential. Direct-coupled negative feedback is provided by resistor 492 coupled between cathodes 489 and 473.

The amplified pulsating voltage at cathode 489 is coupled through series resistor 493 directly to the gain controlling electrode of R. F. amplifier 15 in receiver 12. This amplified pulsating voltage is the automatic amplitude balance control voltage, and is represented by the waveform BB of Fig. 2. This amplified AABC voltage increases the gain of receiver 12 during reception of the loran A pulses relative to the gain during the reception of the B pulses when the A pulses are smaller in magnitude than the received B pulses, as represented by the waveform U.

A diode tube 494 having its anode 495 coupled to the output terminal 496 of series resistor 493 and having its cathode 497 coupled to ground prevents the normally negative pulsating AABC voltage at output terminal 496 from ever becoming positive thereby protecting the R. F. amplifier tube.

An automatic gain control voltage is produced from the amplified negative AABC voltage at the output of the cathode follower by providing a series resistor 498 and a shunt condenser 499 coupled between the output terminal 496 and ground. This resistor-condenser network provides an integration of the negative pulsating voltage, and condenser 499 is gradually charged to a negative potential equal to the magnitude of the amplifier negative AABC voltage during the half-cycle $t_1$. This may be understood by referring to the waveform BB of Fig. 2 where the broken line 500 represents the voltage across condenser 499 which has increased exponentially from zero to the negative value shown. This negative AGC voltage across condenser 499 is illustrated as waveform AA of Fig. 2. The condenser 499 is prevented from becoming charged to a more negative potential, i. e. the potential of waveform BB during the half-cycle $t_2$ by a diode 501 having its anode 502 coupled to terminal 496 and its cathode 503 coupled to the junction of resistor 498 and condenser 499. During the interval $t_2$, the negative voltage across condenser 499 gradually increases until the end of the half-cycle $t_2$. At the end of $t_2$ the negative AABC voltage abruptly decreases in value and the voltage at terminal 496 is less negative than the voltage across condenser 499. As a result diode 501 conducts and partially discharges condenser 499 until its voltage equals the value of the AABC voltage during interval $t_1$. Thus, the rectifier 501 prevents the condenser 499 from becoming charged to the full negative AABC voltage during the interval $t_2$ and, therefore, the AGC voltage is substantially equal to the smaller or least negative half-cycle of the amplified AABC voltage at terminal 496. The AGC voltage is applied directly to the gain controlling electrodes of mixer 16 and I. F. amplifier 18 of receiver 12.

The AABC voltage of waveform BB is essentially clamped to the AGC voltage since it can never become less negative than the AGS voltage. In other words, the AGC voltage is substantially equal in magnitude to the least negative half-cycle of the AABC voltage, i. e., the half-cycle occurring during the time interval $t_1$. As a result the need for an amplitude balance restorer in receiver 12 as required in the aforesaid Patent 2,651,033 and in applications S. N. 403,711 and S. N. 403,852 is eliminated.

The simplified automatic gain and amplitude balance control circuits of the present invention control the gain of receiver 12 in the same general manner as taught in the pending applications S. N. 403,771 and S. N. 403,852 to maintain the output A and B pulses from receiver 12 substantially equal to a predetermined output level. The loran receiver-indicator with these simplified gain control circuits is adjusted by an operator to obtain useful navigational information in an identical manner as explained in the aforesaid Patent 2,651,033 under the section "Operation of Improved Loran Receiver-Indicators."

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio navigation receiver responsive to recurrent pulses including a first pulse received during a first time interval and a second pulse received during a second time interval wherein the strength of the received first pulses may be different from the strength of the received second pulses, said receiver including first and second electrically controllable variable gain amplifiers; means for producing a voltage whose phase is determined by the strength of the received first pulses relative to the strength of the received second pulses and whose amplitude is determined by the difference in strengths between the received first and second pulses, comprising in combination, first and second condensers, switching means coupled to said first and second condensers, means energizing said switching means for coupling said first condenser across the output of said navigation receiver during said first time interval and for coupling said second condenser across the output of said navigation receiver during said second time interval, said first condenser being responsive to said first pulse for producing a first direct potential varying according to the strength of said first pulse, said second condenser being responsive to said second pulse for producing a second direct potential varying according to the strength of said second pulse, the voltage across the output of said receiver alternating between said first direct potential and said second direct potential, direct-coupled amplifier means coupled to the output of said navigation receiver for amplifying said voltage alternating between said first and second direct potentials, means coupling said amplified voltage from the output of said direct-coupled amplifier to said first electrically controllable variable gain amplifier for varying the gain of said receiver during one of said time intervals, integrating means coupled to the output of said direct-coupled amplifier, said integrating means including a series resistor and a shunt condenser, said shunt condenser being charged by the amplified voltage alternating between said first and second direct potentials, rectifier means coupled across said series resistor, said rectifier means partially discharging said shunt condenser when the voltage across said shunt condenser increases above the value of one of the amplified first and second direct potentials, and means coupling the voltage across said shunt condenser varying substantially according to the magnitude of one of the amplified first and second direct potentials to said second electrically controllable variable gain amplifier for substantially suppressing variations in the magnitude of one of said output received first and second recurrent pulses.

2. In a radio navigation receiver responsive to recurrent pulses including a first pulse received during a first time interval and a second pulse received during a second time interval wherein the strength of the received first pulses may be different from the strength of the received second pulses, said receiver including an electrically controllable variable gain amplifier for amplifying said recurrent pulses; means for producing an alternating voltage whose phase is determined by the strength of the received first pulses relative to the strength of the received second pulses and whose amplitude is determined by the difference in strength between the received first and second pulses, comprising in combination, first and second energy storage means, switching means coupled to said first and second energy storage means, means energizing said switching means for coupling said first energy storage means across the output of said navigation receiver during said first time interval and for coupling said second energy storage means across the output of said navigation receiver during said second time interval, said first energy storage means being responsive to said first pulse for producing a first direct potential varying according to the strength of said first pulse, said second energy storage means being responsive to said second pulse for producing a second direct potential varying according to the strength of said second pulse, the voltage across the output of said navigation receiver alternating between said first potential during said first time interval and said second direct potential during said second time interval, a direct-coupled amplifier coupled to the output of said navigation receiver for receiving said voltage alternating between said first and second direct potentials, means coupling said amplified voltage to said electrically controllable variable gain amplifier for introducing said alternating voltage into said receiver for controlling the gain of said receiver during one of said time intervals, integrating means coupled to the output of said direct-coupled amplifier, said integrating means including a series resistor and a shunt energy storage means, said energy storage means being charged by the amplified voltage alternating between said first and second direct potentials, rectifier means coupled across said series resistor, said rectifier means partially discharging said energy setorage means when the voltage across said shunt energy storage means increases above the smaller amplified direct potential obtained from one of said first or second energy storage means, and means coupling the voltage across said shunt energy storage means varying substantially according to the magnitude of the smaller of the amplified first and second direct potentials to said electrically controllable variable gain amplifier for controlling the gain of said receiver and substantially suppressing variations in the magnitude of the smaller of said received recurrent pulses.

3. An automatic gain control system for a hyperbolic navigation receiver responsive to recurrent A pulses transmitted from a master station and to recurrent B pulses transmitted from a slave station, comprising means including a switching means and first and second condensers, means coupled to said switching means for coupling said first condenser across the output of said navigation receiver during reception of said recurrent A pulses, and for coupling said second condenser across the output of said navigation receiver during reception of said recurrent B pulses, said first condenser being charged to a first direct potential value according to the strength of said recurrent A pulses, said second condenser being charged to a second direct potential value according to the strength of said recurrent B pulses, the voltage across the output of said navigation receiver alternating between said first direct potential value across said first condenser during reception of said A pulses and said second direct potential value across said second condenser during reception of said B pulses, means including integrating means coupled to the output of said navigation receiver, said integrating means including a series resistor and a shunt condenser, said shunt condenser being charged by the voltage alternating between said first and second direct potentials, rectifier means coupled across said series resistor, said rectifier means partially discharging said shunt condenser when the voltage across said shunt condenser increases above the level of the smaller of said first and second direct potentials, and means coupling the voltage across said shunt condenser varying substantially according to the magnitude of the smaller of said first and second direct potentials to said receiver for substantially suppressing variations in the magnitude of the smaller of the received A and B pulses.

4. In combination, means for producing a recurrent wave consisting of a first pulse occurring during a first time interval and a second pulse occurring during a second time interval, the magnitude of said first pulse being independent of the magnitude of said second pulse, said producing means including means for varying the strength of said first and second pulses, first means coupled to the output of said producing means for providing a first direct potential varying in magnitude according to the strength of said first pulse, second means coupled to the output of said producing means for providing a second direct potential varying in magnitude according to the strength of said second pulse, switching means coupled to said first and second means, direct-coupled amplifier means coupled to said switching means, said switching means supplying said first direct potential to said direct-coupled amplifier during said first time interval and supplying said second direct potential to said direct-coupled amplifier during said second time interval, means coupling the amplified first direct potential during said first time interval and the amplified second direct potential during said second time interval to said means for varying the strength of said first and second pulses, integrating means coupled to the output of said direct-coupled amplifier, said integrating means including a series resistor and a shunt condenser and being responsive to said amplified first direct potential during said first time interval and to said amplified second direct potential during said second time interval, said shunt condenser being charged by said first and second direct potentials, rectifier means coupled across said series resistor, said rectifier means conducting current to partially reduce the charge in said condenser when the voltage thereacross increases above the potential of the smaller of said first and second direct potentials, and means coupling the voltage across said condenser varying substantially according to the smaller of said amplified first and second direct potentials to said means for varying the strength of said first and second pulses.

5. The combination as defined in claim 4, wherein said rectifier means is a diode having an anode and a cathode, said cathode being coupled to the junction of said series resistor and said shunt condenser.

6. In combination, means for producing a recurrent wave consisting of a first pulse occurring during a first time interval and a second pulse occurring during a second time interval, the magnitude of said first pulse being independent of the magnitude of said second pulse, said producing means including means for varying the strength of said first and second pulses, first means coupled to the output of said producing means for providing a first direct potential varying in magnitude according to the strength of said first pulse, second means coupled to the output of said producing means for providing a second direct potential varying in magnitude according to the strength of said second pulse, switching means coupled to said first and second means, said switching means providing an output voltage alternating between said first direct potential during said first time interval and said second direct potential during said second time interval, means including integrating means coupled to said switching means, said integrating means including a series resistor and shunt condenser, said shunt condenser being charged by the first and second direct potentials from said switching means, rectifier means coupled across said series resistor, said rectifier means partially discharging said condenser when the voltage thereacross increases above the smaller of said first or second direct potentials from said switching means, and means coupling the voltage across said shunt condenser varying substantially according to the magnitude of the smaller of said first and second direct potentials to said means for varying the strength of said first and second pulses for suppressing variations in the magnitude of the smaller of said recurrent first and second pulses.

7. The combination comprising means producing an output voltage alternating between a first direct potential during a first time interval and a second direct potential during a second time interval, the magnitude of said first direct potential being independent of the magnitude of said second direct potential, integrating means coupled to the output of said producing means, said integrating means including a series resistor and a shunt condenser, said shunt condenser being charged by said first and second direct potentials, and rectifier means coupled across said series resistor, said rectifier means conducting current and partially discharging said shunt condenser when the voltage thereacross exceeds the smaller of said first and second direct potentials, the output voltage across said shunt condenser varying substantially according to the smaller of said first and second direct potentials.

8. An automatic gain control system for a hyperbolic navigation receiver responsive to recurrent A pulses transmitted from a master station and to recurrent B pulses transmitted from a slave station, said navigation receiver producing an output voltage alternating between a first direct potential varying according to the strength of the received A pulses and a second direct potential varying according to the strength of the received B pulses, comprising in combination, integrating means coupled to the output of said receiver, said integrating means including a series resistor and a shunt condenser, said condenser being charged by said first and second direct potentials, rectifier means coupled across said series resistor, said rectifier means conducting current and partially discharging said condenser when the voltage thereacross exceeds the smaller of said first and second direct potentials, the voltage across said condenser varying substantially according to the smaller of said first and second direct potentials, and means coupling the voltage across said condenser to said navigation receiver for substantially suppressing variations in the strength of the smaller of the received recurrent A and B pulses.

9. An automatic gain control system for a hyperbolic navigation receiver responsive to recurrent A pulses transmitted from a master station and to recurrent B pulses transmitted from a slave station, said navigation receiver producing a first output voltage varying according to the strength of the received A pulses and a second output voltage varying according to the strength of the received B pulses, comprising in combination, integrating means coupled to the output of said receiver, said integrating means including a resistor and an energy storage means, said energy storage means providing an output control voltage varying according to one of said first and second output voltages, rectifier means coupled across said resistor means, said rectifier means conducting current when the control voltage across said energy storage means exceeds the smaller of said first and second output voltages, the control voltage across said energy storage means varying substantially according to the smaller of said first and second voltages, and means adapted for coupling said control voltage to said navigation receiver for substantially suppressing variations in the strength of the smaller of the received recurrent A and B pulses.

No references cited.